(12) United States Patent
Chen

(10) Patent No.: US 8,189,873 B2
(45) Date of Patent: May 29, 2012

(54) METHOD OF MOTION DETECTION USING MOTION INFORMATION OF NEIGHBORING PIXELS

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 808 days.

(21) Appl. No.: 12/352,957

(22) Filed: Jan. 13, 2009

(65) Prior Publication Data
US 2010/0177934 A1    Jul. 15, 2010

(51) Int. Cl.
*G06K 9/00*        (2006.01)
*H04N 11/20*       (2006.01)

(52) U.S. Cl. .................. 382/107; 382/291; 348/452

(58) Field of Classification Search .......... 382/100, 382/103, 106, 107, 155, 168, 162, 173, 181, 382/194, 210, 232, 254–266, 291, 305, 312; 348/240.2, 449, 452; 375/240.12
See application file for complete search history.

(56) References Cited

U.S. PATENT DOCUMENTS

| | | | | |
|---|---|---|---|---|
| 5,936,676 A * | 8/1999 | Ledinh et al. | ................. | 348/452 |
| 6,985,187 B2 * | 1/2006 | Han et al. | ...................... | 348/452 |
| 7,269,220 B2 * | 9/2007 | Alvarez | ................... | 375/240.12 |
| 7,307,664 B2 * | 12/2007 | Wong | ............................ | 348/452 |
| 7,362,379 B2 * | 4/2008 | Michel et al. | ................. | 348/452 |
| 7,800,692 B2 * | 9/2010 | Wredenhagen et al. | ...... | 348/449 |
| 8,054,344 B2 * | 11/2011 | Cheung et al. | ............ | 348/240.2 |

* cited by examiner

*Primary Examiner* — Seyed Azarian
(74) *Attorney, Agent, or Firm* — J.C. Patents

(57) ABSTRACT

A method of motion detection using motion information of neighboring pixels, adaptive for determining whether a plurality of target pixels in a current field are moving pixels, is provided. First, it is determined whether a neighboring pixel in a previous field corresponding to the target pixel in the current field is the moving pixel. If the neighboring pixel in the previous field is the moving pixel, the target pixel is determined as the moving pixel and otherwise it is further determined whether the neighboring pixels around the target pixel in the current field are the moving pixels. If the neighboring pixels in the current field are the moving pixels, then the target pixel is determined as the moving pixel. Accordingly, the mistakenly judged static pixels can be found and modified to moving pixels, such that the accuracy of motion detection can be increased.

9 Claims, 3 Drawing Sheets

METHOD OF MOTION DETECTION USING MOTION INFORMATION OF NEIGHBORING PIXELS

BACKGROUND OF THE INVENTION

1. Field of the Invention

The present invention generally relates to a method of motion detection, and more particularly, to a method of motion detection using motion information of neighboring pixels.

2. Description of Related Art

With development of multimedia technique, requirement for image quality is substantially increased. The image quality may be influenced by the noises generated during image capturing, signal conversion and signal transmission. Therefore, an image processing technique is required to eliminate the noises that may be sensed by human eyes. The image processing methods for noise reduction commonly include a spatial noise-reduction process and a temporal noise-reduction process.

The spatial noise-reduction process applies a filter to perform spatial filtering process on the pixels of a current frame, so as to smooth and soften the frame, and reduce a visual perception of the human eyes for the noises. However, such method generally leads to image blurs, which may influence the presentation of image details, such as edges and textures, for example.

The temporal noise-reduction process references information of a previous frame, so as to perform temporal filtering process to the pixels of the current frame. Since the current frame is highly related to the previous frame, the temporal noise-reduction process can maintain and reserve details of the frame. However, when the temporal filtering process is performed on a moving object within the frame, motion blurs may occur on the edges of the moving object. Therefore, a motion detection algorithm is provided to detect the moving pixels in the frame, so as to adjust an intensity of the temporal filtering for eliminating the motion blurs.

Generally speaking, motion detection uses differences between corresponding pixels in the same parity field to determine whether the designated pixels are moving pixels or not. If the difference is larger than a preset threshold, it means a variation is occurred in the content of the video and the corresponding pixels are determined as the moving pixels. On the other hand, if the difference is smaller than the preset threshold, it means no variation is occurred in the content of the video and the corresponding pixels are determined as the static pixels.

Through the motion detection as described above, motion information of pixels of the moving object is obtained and referenced for determining whether to use a spatial interpolation or a temporal interpolation method to generate the required frame data, in which the temperal interpolation is used for calculating values of pixels in an area with no moving object and the spacial interpolation is used for calculating values of pixels in an area with moving objects.

As described in the above, the motion detection algorithm is complicated and requires a large amount of calculation. If the moving object is mistakenly detected as a static object, the pixels thereof will be calculated through the temporal interpolation method and accordingly serious noises will be generated. Therefore, there is a need to increase the correctivity of motion detection while reducing the size of the buffer needed for storing the reference motion information.

SUMMARY OF THE INVENTION

In light of the above, the present invention provides a method of motion detection using motion information of neighboring pixels, in which motion information of neighboring pixels is used to determine whether a target pixel is a moving pixel.

In order to achieve the above-mentioned or other objects, the present invention provides a method of motion detection using motion information of neighboring pixels, adaptive for determining whether a plurality of target pixels in a current field are moving pixels or not. First, it is determined whether a neighboring pixel in a previous field corresponding to the target pixel in the current field is the moving pixel. If the neighboring pixel in the previous field is the moving pixel, the target pixel is determined as the moving pixel and if the neighboring pixel in the previous field is not the moving pixel, it is further determined whether the neighboring pixels around the target pixel in the current field are the moving pixels. If the neighboring pixels in the current field are the moving pixels, then the target pixel is determined as the moving pixel.

According to an embodiment of the present invention, before the step of determining whether the neighboring pixel in the previous field corresponding to the target pixel in the current field is the moving pixel, it is determined whether the target pixel in the current field is the moving pixel. If the target pixel in the current field is determined as the moving pixel, then the target pixel is determined as the moving pixel, and otherwise the target pixel is determined as a static pixel.

According to an embodiment of the present invention, in the step of determining whether the neighboring pixels around the target pixel in the current field are the moving pixels so as to determine whether the target pixel is the moving pixel or not, whether the neighboring pixel of the target pixel in a previous scan line or in a next scan line of the current field is the moving pixel is determined first. If any one of the neighboring pixels is determined as the moving pixel, then the target pixel is determined as the moving pixel, and otherwise it is further determined whether the neighboring pixels adjacent to the target pixel in the same scan line of the current field are the moving pixels. If yes, the target pixel is determined as the moving pixel, and if not, the target pixel is determined as the static pixel.

According to an embodiment of the present invention, the method further records motion information of the target pixel in a buffer, in which motion information of the target pixel is corrected as 0 in the buffer if the target pixel is determined as the moving pixel, and the motion information of the target pixel is accumulated by 1 in the buffer if the neighboring pixel in the previous field is determined as the static pixel.

According to an embodiment of the present invention, in the step of determining whether the neighboring pixel in the previous field corresponding to the target pixel in the current field is the moving pixel, the motion information of the neighboring pixel in the previous field recorded in the buffer is read and used to determine whether the neighboring pixel is the moving pixel.

According to an embodiment of the present invention, in the step of determining whether the neighboring pixels around the target pixel in the current field are the moving pixels, the motion information of the neighboring pixels around the target pixel in the current field recorded in the buffer is read and used to determine whether the neighboring pixel is the moving pixel.

According to an embodiment of the present invention, in the step of determining whether the neighboring pixel is the moving pixel according to the read motion information, the neighboring pixel is determined as the moving pixel if the read motion information is 0, 1, or 2 and is determined as the static pixel if the read motion information is 3.

According to an embodiment of the present invention, the size of the buffer is two bits for each pixel in a field.

In the present invention, a neighboring pixel in a previous field corresponding to a target pixel in the current field and the neighboring pixels around the target pixel in the current field are used to determine whether the target pixel is the moving pixel, such that an edge of a moving object or an fast moving object can be precisely detected. Moreover, two bits buffer are used to record the motion information of each pixel in a previous field and a current field, such that the moving pixel can be determined according to the recorded motion information.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
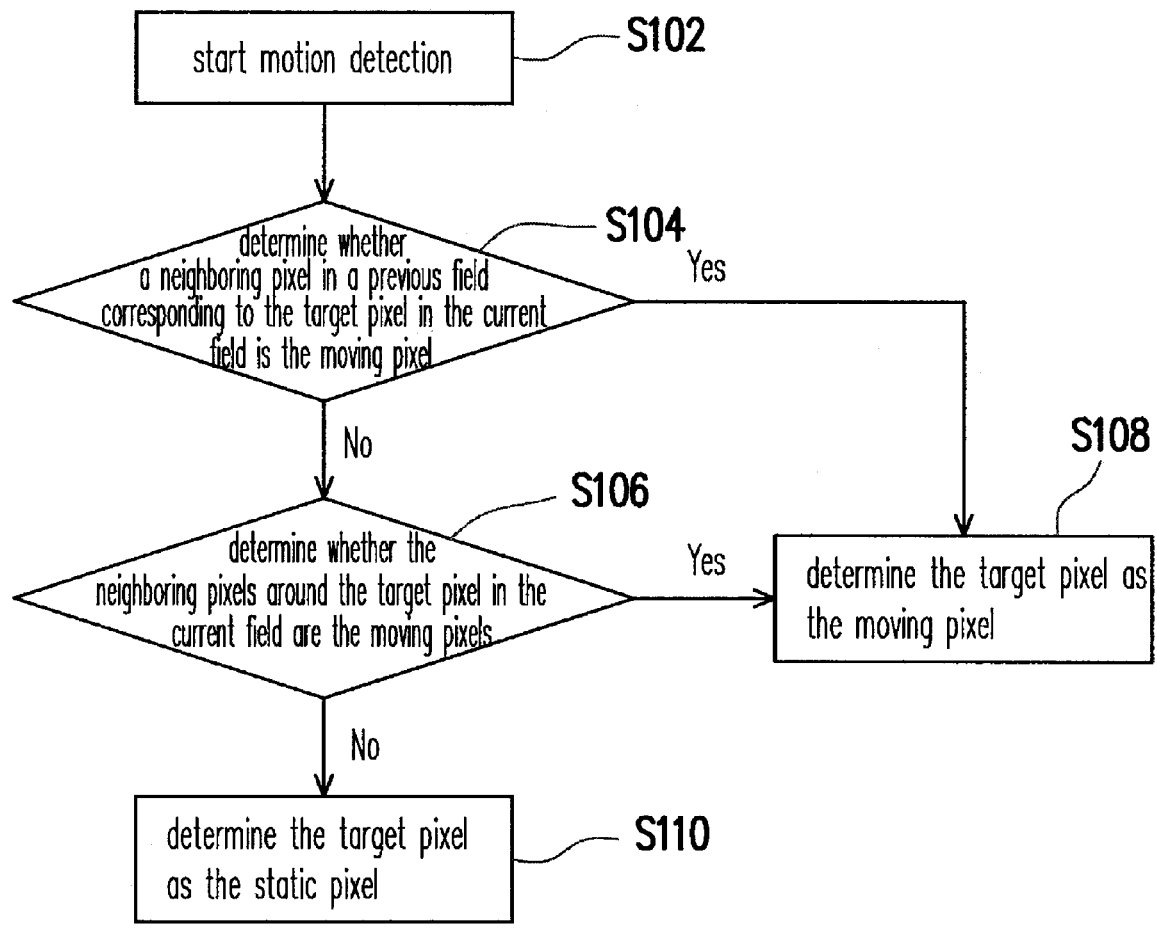
FIG. 1 is a flowchart illustrating a method of motion detection using motion information of neighboring pixels according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention records the motion information of pixels of a previous field and a current field by using additional bits and provides the same for follow-up motion detection. When performing motion detection on a target pixel, a temporal motion detection is performed first according to the motion information of neighboring pixels in the previous field and then a spatial motion detection is performed next according to the motion information of neighboring pixels in the current field. Accordingly, the mistakenly judged static pixels can be found and modified to moving pixels, such that the accuracy of motion detection can be increased. In order to make the present invention more comprehensible, embodiments are described below as the examples to prove that the invention can actually be realized.

FIG. 1 is a flowchart illustrating a method of motion detection using motion information of neighboring pixels according to one embodiment of the present invention. Referring to FIG. 1, the present embodiment performs motion detection according to the motion information in a temporal domain and a spatial domain, so as to precisely detect the edges of moving objects. The steps of the method are as follows.

The present embodiment determines whether a plurality of target pixels in a current field are moving pixels or not when performing motion detection on the pixels in the current field. When the motion detection starts (S102), first, it is determined whether a neighboring pixel in a previous field corresponding to the target pixel in the current field is the moving pixel (S104), in which the neighboring pixel corresponding to the target pixel means the neighboring pixel and the target pixel are in the same row and in the same column and the term "neighboring pixel" means the pixel is temporally adjacent to the target pixel. In detail, the motion information of the neighboring pixel in the previous field is read from the buffer and used to determine whether the neighboring pixel is the moving pixel.

In the step S104, if the neighboring pixel in the previous field is determined as the moving pixel, the target pixel is determined as the moving pixel (S108). On the other hand, if the neighboring pixel in the previous field is determined as not the moving pixel, then the motion detection is further proceeded to reference the neighboring pixels spatially adjacent to the target pixel, that is, whether the neighboring pixels around the target pixel in the current field are the moving pixels is determined (S106). In detail, the motion information of the neighboring pixels around the target pixel in the current field is read from the buffer and used to determine whether the neighboring pixel is the moving pixel, in which if the neighboring pixels around the target pixel in the current field are determined as the moving pixels, then the target pixel is determined as the moving pixel (S108), and otherwise the target pixel is determined as the static pixel (S110).

It should be noted herein that the neighboring pixels as being referenced in the step S106 are the pixels on the left of the target pixel, on the right of the target pixel, above the target pixel and below the target pixel, for example. Accordingly, in the step S106, it is determined first whether the neighboring pixel of the target pixel in a previous scan line or in a next scan line of the current field is the moving pixel. If any one of the neighboring pixels is determined as the moving pixel, then the target pixel is determined as the moving pixel. If the neighboring pixels are not determined as the moving pixels, it is determined next that whether the neighboring pixels adjacent to the target pixel in the same scan line of the current field are the moving pixels. If the neighboring pixels are determined as the moving pixels, then the target pixel is determined as the moving pixel, and if the neighboring pixels are not determined as the moving pixels, then the target pixel is determined as the static pixel.

Based on the above, the motion information of the neighboring pixels temporally or spatially adjacent to the target pixel is referenced to determine whether the target pixel is the moving pixel or the static pixel, so as to increase the accuracy of motion detection. In order to implement the motion detection method as described above, the present invention further records the motion information to be referenced to and updates the same every time the determination of a target pixel is completed. An embodiment is given below for further illustration.

Figure 2:
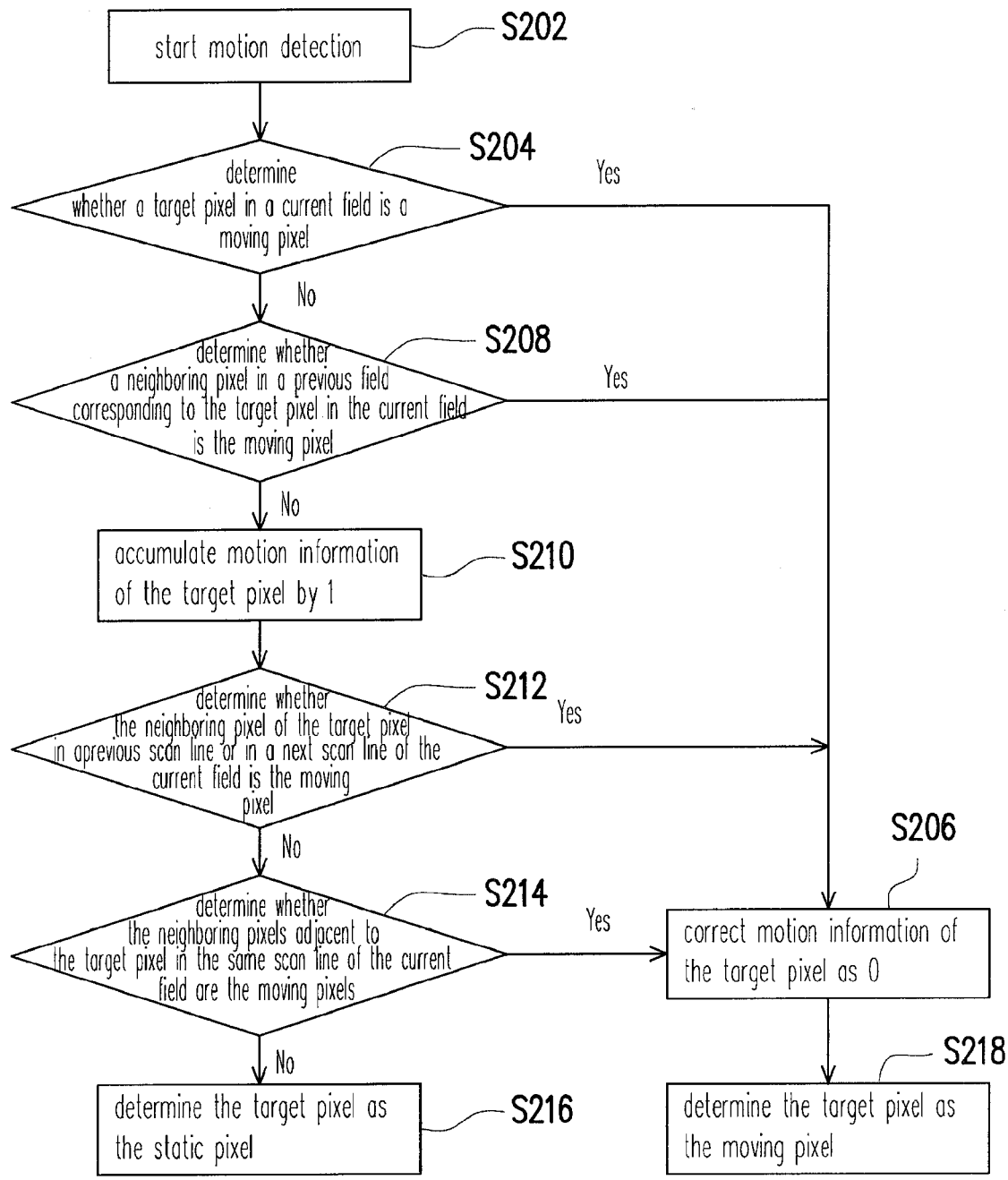
FIG. 2 is a flowchart illustrating a method of motion detection using motion information of neighboring pixels according to one embodiment of the present invention.
Figure 3:
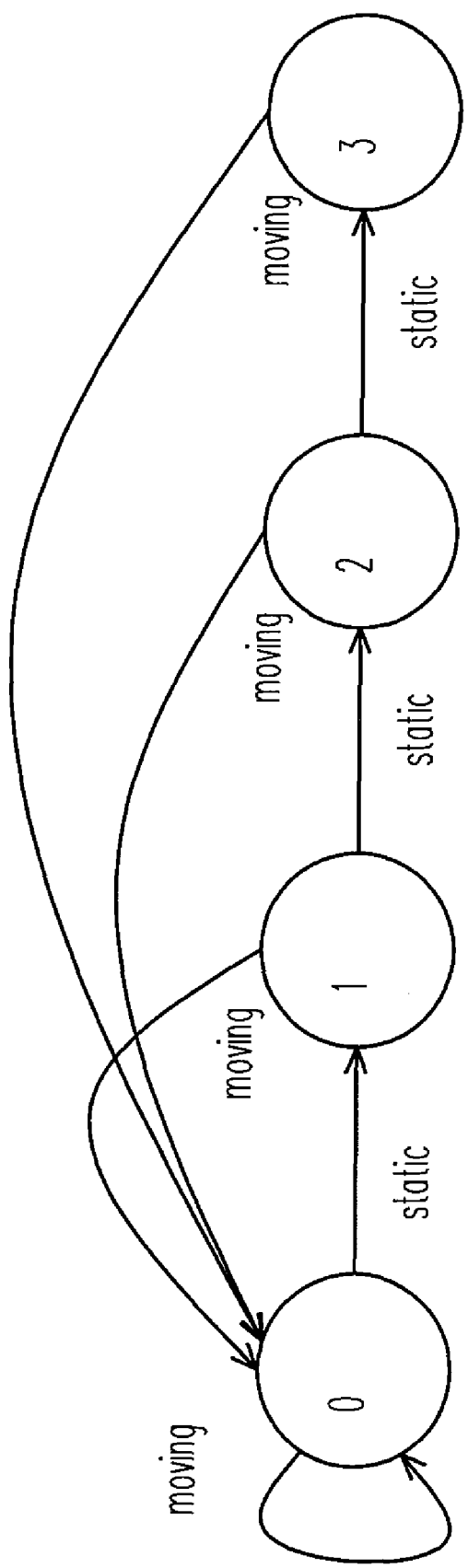
FIG. 3 is a finite state machine illustrating states for determining whether a target pixel is a moving pixel or a static pixel according to one embodiment of the present invention.

FIG. 2 is a flowchart illustrating a method of motion detection using motion information of neighboring pixels according to one embodiment of the present invention. FIG. 3 is a finite state machine illustrating states for determining whether a target pixel is a moving pixel or a static pixel according to one embodiment of the present invention. Referring to both FIG. 2 and FIG. 3, the present embodiment performs motion detection through referencing the motion information of a previous field and a current field which is previously recorded in a buffer.

In detail, to identify whether a pixel is a moving pixel or a static pixel, it is necessary to use at least one bit to record the identification information, that is, one of the binary value for representing the moving pixel, and the other binary value for representing the static pixel. Accordingly, a buffer with a size of two fields is needed for recording motion information of each field. For better use of those bits, the present embodiment jointly uses two bits for a set of pixels in odd and even fields, such that the variation of the motion information can be expended to values 0, 1, 2, and 3 instead of values 0 and 1.

When the motion detection starts (S202), first, it is determined whether the target pixel in the current field is the moving pixel (S204). In the step S204, a general motion detection algorithm is executed to identify whether the target pixel in the current field is the moving pixel. For example, the difference of luminance between each two fields are calculated and compared with a threshold, in which if the difference is larger than the threshold, then the corresponding pixels are determined as the moving pixels.

Further, in the step S204, if the target pixel in the current field is determined as the moving pixel, then the motion information of the target pixel is corrected as 0 (S206), which is used to determine the target pixel as the moving pixel (S218) in the follow-up motion detection process.

On the other hand, if the target pixel in the current field is not determined as the moving pixel, then it is further determined whether a neighboring pixel in a previous field corresponding to the target pixel in the current field is the moving pixel (S208), in which if the neighboring pixel in the previous field is determined as the moving pixel, then the motion information of the target pixel is corrected as 0 (S206), which is used to determine the target pixel as the moving pixel (S218) in the follow-up motion detection process.

If the neighboring pixel in the previous field is not determined as the moving pixel, then the motion information of the target pixel is accumulated by 1 (S210). At this time, the motion information of the designated pixel is updated to 1, which still represents that the pixel is the moving pixel.

After accumulating the motion information, it is further determined whether the neighboring pixel of the target pixel in a previous scan line or in a next scan line of the current field is the moving pixel (S212). If any one of the neighboring pixels is determined as the moving pixel, then the motion information of the target pixel is corrected by 0 (S206), which can be used to determine the target pixel as the moving pixel (S218) in the follow-up motion detection process.

On the other hand, if neither of the neighboring pixels is determined as the moving pixel, then it is further determined whether the neighboring pixels adjacent to the target pixel in the same scan line of the current field are the moving pixels (S214). If the neighboring pixels are determined as the moving pixels, then the motion information of the target pixel is corrected by 0 (S206), which can be used to determine the target pixel as the moving pixel (S218) in the follow-up motion detection process.

On the other hand, if the neighboring pixels are not determined as the moving pixels, then the target pixel is determined as the static pixel (S216).

It should be noted herein that, as shown in FIG. 3, the motion information can be regarded as the reliability of being the static pixel. Once the neighboring pixel in the previous field is determined as the static pixel, the motion information is accumulated by 1 and the reliability is increased accordingly. The motion information is kept being accumulated if the corresponding pixels in continuous fields are determined as the static pixels. Only when the motion information is accumulated to 3, then the designated pixel is determined as a real static pixel.

To sum up, the present invention provides a method of motion detection using motion information of neighboring pixels, in which not only the difference between two fields are used for motion detection, but the neighboring pixels temporally or spatially adjacent to the target pixel are used for motion detection. Therefore, the accuracy of motion detection can be increased. Moreover, only two bits is used to record the motion information of each pixel in a field, such that the size of the buffer can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of motion detection using motion information of neighboring pixels, adaptive for determining whether a plurality of target pixels in a current field are moving pixels or not, the method comprising:

determining whether the target pixel in the current field is the moving pixel;

if yes, determining the target pixel as the moving pixel;

if not, determining the target pixel as a static pixel; then determining whether a neighboring pixel in a previous field corresponding to the target pixel in the current field is the moving pixel;

if the neighboring pixel in the previous field is the moving pixel, determining the target pixel as the moving pixel;

if the neighboring pixel in the previous field is not the moving pixel, determining whether the neighboring pixels around the target pixel in the current field are the moving pixels; and if the neighboring pixels around the target pixel in the current field are the moving pixels, determining the target pixel as the moving pixel.

2. The method for method of motion detection using motion information of neighboring pixels according to claim 1, wherein the step of determining whether the neighboring pixels around the target pixel in the current field are the moving pixels so as to determine whether the target pixel is the moving pixel or not comprises:

determining whether the neighboring pixels of the target pixel in a previous scan line and in a next scan line of the current field is the moving pixel;

if yes, determining the target pixel as the moving pixel;

if not, determining whether the neighboring pixels adjacent to the target pixel in the same scan line of the current field are the moving pixels;

if yes, determining the target pixel as the moving pixel; and if not, determining the target pixel as the static pixel.

3. The method for method of motion detection using motion information of neighboring pixels according to claim 2, further comprises:

recording motion information of the target pixel in a buffer.

4. The method for method of motion detection using motion information of neighboring pixels according to claim 3, wherein the step of recording motion information of the target pixel in the buffer comprises:

correcting motion information of the target pixel as 0 in the buffer if the target pixel is determined as the moving pixel.

5. The method for method of motion detection using motion information of neighboring pixels according to claim 3, wherein the step of recording motion information of the target pixel in the buffer comprises:

accumulating the motion information of the target pixel by 1 in the buffer if the neighboring pixel in the previous field is determined as the static pixel.

6. The method for method of motion detection using motion information of neighboring pixels according to claim 3, wherein the step of determining whether the neighboring pixel in the previous field corresponding to the target pixel in the current field is the moving pixel comprises:
- reading the motion information of the neighboring pixel in the previous field recorded in the buffer; and
- determining whether the neighboring pixel is the moving pixel according to the read motion information.

7. The method for method of motion detection using motion information of neighboring pixels according to claim 6, wherein the step of determining whether the neighboring pixels around the target pixel in the current field are the moving pixels comprises:
- reading the motion information of the neighboring pixels around the target pixel in the current field recorded in the buffer; and
- determining whether the neighboring pixels are the moving pixels according to the read motion information.

8. The method for method of motion detection using motion information of neighboring pixels according to claim 7, wherein the step of determining whether the neighboring pixels are the moving pixels according to the read motion information comprises:
- determining the neighboring pixel as the moving pixel if the read motion information is 0, 1, or 2; and
- determining the neighboring pixel as the static pixel if the read motion information is 3.

9. The method for method of motion detection using motion information of neighboring pixels according to claim 2, wherein the size of the buffer is two bits for each pixel in a field.

* * * * *